June 2, 1959  C. S. GLENNY  2,889,096
BICYCLE BASKETS
Filed Jan. 26, 1956
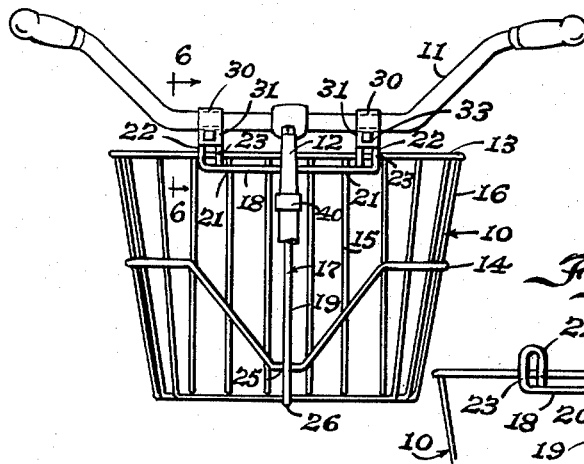
Fig. 1
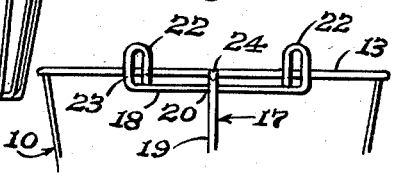
Fig. 3
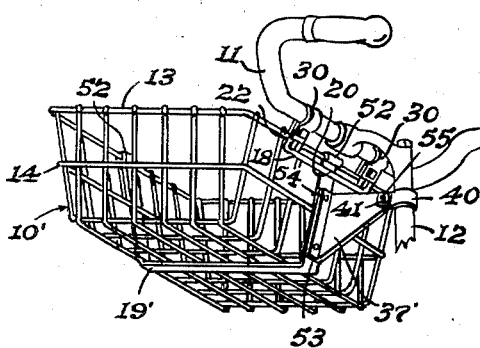
Fig. 7
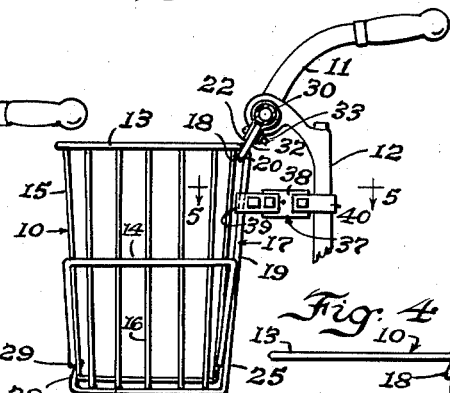
Fig. 2
Fig. 4
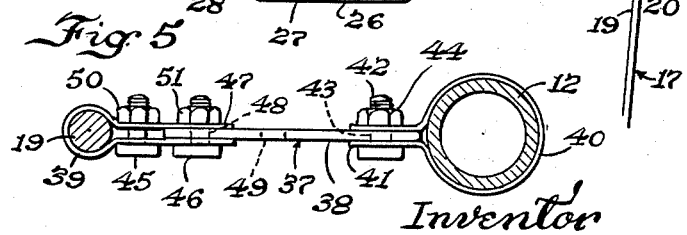
Fig. 5
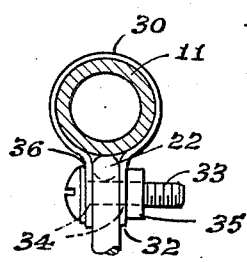
Fig. 6
Inventor
Clarence S. Glenny
Atty

United States Patent Office 2,889,096
Patented June 2, 1959

2,889,096

BICYCLE BASKETS

Clarence S. Glenny, Rockford, Ill., assignor to The Washburn Company, Worcester, Mass., a corporation of Massachusetts Application January 26, 1956, Serial No. 561,392

8 Claims. (Cl. 224—36)

This invention relates to bicycle baskets and is more particularly concerned with improvements in the means or facilities for mounting the basket on the handlebar and handlebar stem with a view to avoiding the need for any prop or props attached to the front mud guard, front fork or front axle, and thereby making the basket substantially universally adaptable to different makes and models of bicycles while at the same time assuring greater rigidity.

A salient feature of the present invention is the provision in connection with a basket of conventional wire construction having the usual wire top frame and another wire frame in spaced relation therebelow for reinforcement of the basket, of mounting means comprising a generally T-shaped supporting frame secured to the back of the basket at the middle thereof, the cross-portion of the T having upwardly projecting loops adapted to accommodate clamping bolts that serve to draw together the end portions of sheet metal clips that encircle the handlebar and have closely spaced end portions abutting the flat opposite sides of said loops and are wide enough to straddle said loops, whereby when the bolts are tightened to cause the clips to grip the handlebar the end portions of the clips are at the same time closed on opposite sides of the loops to fasten the basket in rigid relationship to the handlebar. The vertical leg of the frame, which preferably has a bent lower end portion extending under the basket and up the front thereof for reinforcement of the basket, has rigid bracing means connected thereto at one end and at the other end to the handlebar stem far enough below the handlebar to insure good rigidity of the basket. This vertical leg of the T-frame also extends upwardly beyond the cross-portion of the T for connection with the wire top frame so as to add further reinforcement to the basket. The cross-portion of the T-frame is preferably of wire construction welded at its mid point to the vertical leg of the T-frame and at other points spaced longitudinally thereof to upwardly extending wires on the back of the basket, the aforesaid upwardly projecting loops being formed by upwardly bent opposite end portions of this wire and these loops having the opposite side portions thereof welded to the wire top frame of the basket for maximum strength and rigidity of the construction.

The invention is illustrated in the accompanying drawing, in which—

Figs. 1 and 2 are a rear view and side view, respectively, of a basket made in accordance with my invention shown applied to a handlebar and handlebar stem, a portion of the handlebar being broken away in Fig. 2 in order to better illustrate the construction;

Figs. 3 and 4 are a fragmentary rear view and side view, respectively, of the basket by itself;

Fig. 5 is an enlarged sectional detail on the line 5—5 of Fig. 2 showing the parts approximately full size;

Fig. 6 is an enlarged sectional detail on the line 6—6 of Fig. 1 showing the parts approximately full size, and Fig. 7 is a perspective view of another basket of modified or alternative construction shown fastened in a similar manner to a handlebar and handlebar stem.

Similar reference numerals are applied to corresponding parts throughout the views.

Referring to the drawing, the basket in Figs. 1 to 6 designated generally by the reference numeral 10 is shown applied to a bicycle handlebar 11 and its supporting stem 12. In accordance with the present invention, the basket 10 is of conventional wire construction, that is to say, it has a heavy rectangular wire top frame 13 and another heavy rectangular wire mid-frame 14 in spaced relation therebelow, and these two frames are welded or otherwise suitably secured at the front and back portions thereof to the upper ends of wires 15 that extend in a fore and aft direction across the bottom of the basket and have upwardly bent end portions at the front and back of the basket that are welded or otherwise suitably secured to the frames 13 and 14. Other wires 16 are disposed in crosswise relation to the wires 15 on the bottom of the basket and have upwardly bent end portions at opposite ends of the basket which are welded or otherwise suitably secured to the end portions of the frames 13 and 14. A T-shaped supporting frame 17, which in the present form is entirely of heavy wire construction, using wire of approximately the same gauge as that used for frames 13 and 14, comprises a horizontal wire 18 and a vertical wire 19 welded together at their intersection 20. The horizontal wire 18 is spaced below and parallel to the top frame 13 and is welded to the vertical wires 15 on the back of the basket at the intersections 21. Loops 22 are formed on the ends of wire 18 extending upwardly and inclined rearwardly, as shown, and these loops are also welded at their opposite sides to the top frame 13 at the intersections 23. The vertical wire 19 has its upper extremity welded to the top frame 13 at 24 and to the middle frame 14 at 25, and it has a forwardly bent lower end portion 26 extending under the bottom of the basket 10 and welded to the wires 16 at 27. An upwardly bent extremity 28 of wire 19 at the front of the basket is welded to a downward V-extension of the frame 14 at 29. It should be clear, therefore, that the T-frame 17 which I provide for mounting the basket on the handlebar and handlebar stem provides a good measure of reinforcement to the basket, besides facilitating the more secure as well as more rigid mounting of the basket, as will now be described.

Two sheet metal clips 30 are provided for fastening the basket to the handlebar 11, these clips encircling the handlebar and having closely spaced substantially parallel end portions 32 which are wide enough to straddle the loops 22, as clearly appears in Fig. 1, and are adapted to be brought into more or less tight engagement with the flat faces on the opposite sides of the loops 22 when bolts 33 are tightened, these extending through holes 34 provided in the end portions 32 and having nuts 35 threaded thereon, as best appears in Fig. 6. Only a single hole 34 is shown in each end portion 32 of the clip 30 but, if desired, three holes may be provided in longitudinally spaced relation in one of these end portions, so that in the case of a handlebar of medium diameter, the middle one of these three holes is used in entering the bolt 33 through the end portions 32, and the other holes are used in fastening the clip onto a small size handlebar and a large size handlebar. A lock washer 36 is preferably provided under the head of the bolt 33 to reduce likelihood of the bolt loosening after it has once been tightened properly. It should be clear from inspection of Figs. 2 and 6 that when the clips 30 have been drawn up tightly enough to clamp the handlebar 11, the end portions 32 of the clips are then also either in full clamping engagement with opposite sides of the loops 22 or are in more or less close abutment therewith so as to fasten the basket in rigid relationship to the handlebar. This portion of the mounting is strong enough and rigid enough so that in many cases no additional support or brace for the basket would be needed. However, a brace is indicated at 37 in Fig. 2 and illustrated more clearly in Fig. 5 providing additional support for the basket on the handlebar stem 12.

The brace 37 comprises a plate 38 having sheet metal clips 39 and 40 secured to the opposite ends thereof. The clip 40 surrounds the stem 12 and has closely spaced end portions 41 in which holes are provided through which a bolt 42 is passed, the bolt also passing through a hole 43 in the adjacent end of the plate 38, and having a nut 44 threaded thereon to draw the end portions 41 together and clamp the plate 38 therebetween and at the same time tighten the clip 40 on the stem 12 so that it cannot turn thereon. The clip 39 encircles the wire 19 of T-frame 17 and has two bolts 45 and 46 entered through longitudinally spaced holes provided in the closely spaced end portions 47 thereof, these holes being spaced the same as holes 48 and 49 provided in the adjacent end portion of the plate 38 so that the bolts 45 and 46 may be entered through holes 48 and 49 or, as shown in Figs. 2 and 5, use only the hole 48 if a longer brace is needed between the basket and the handlebar stem. Nuts 50 and 51 are threaded on the bolts 45 and 46, and when these bolts are tightened the clip 39 grips the wire 19 firmly and at the same time grips the front end of the plate 38 firmly, providing a good rigid brace between the basket and the handlebar stem so that the basket will not sag when loaded.

The basket 10' of Fig. 7 is of the same wire construction generally as basket 10 of Figs. 1–6 but has a U-shaped sheet metal band 19' extending in a fore and aft direction around the middle thereof and connected at the upper ends of the two arms to the top frame 13 in the manner indicated at 52. This band, which may be and preferably is welded to the frame 14 at the front and back of the basket and also to the wires 16 that extend transversely with respect to the band on the bottom of the basket, has a sheet metal bracket 37' fastened by means of a flange 53 to the upright rear portion thereof as by means of bolts 54. The bracket 37' has the closely spaced free end portions 41 of a sheet metal clip 40 that encircles the stem 12 of the handlebar 11 fastened to its other end as by means of a bolt 55. The clip 40 is adjustable up and down on the stem 12, and, if desired, the bolts 54 may extend through vertical slots in the band 19' or flange 53 to permit vertical adjustment of the bracket 37' also relative to the basket 10'. It should be clear that when the bolt 55 is tightened, the ends 41 of the clip 40 are brought together on opposite sides of the bracket at the same time that the clip clamps the stem 12, so that a rigid connection is provided and there is, therefore, no danger of the basket working loose. The rest of the construction is the same as in Figs. 1 to 6, the wire 18, which provides the two loops 22 on its opposite ends, being welded at 20 to the band 19' at its middle portion, and the loops 22 being welded on both sides thereof to the back of the top frame 13. The two loops 22 have the sheet metal clips 30 that encircle the handlebar 11 connected thereto by means of bolts 33 and nuts 35 to clamp onto the handlebar and at the same time fasten the loops 22 in rigid relationship thereto.

It is believed the foregoing description conveys a good understanding of the objects and advantages of my invention. The appended claims have been drawn to cover all legitimate modifications and adaptations.

I claim:

1. A bicycle basket comprising a basket body having a bottom wall and side, back, and front walls, a substantially horizontal member mounted rigidly on the back wall in downwardly spaced parallel relation to the upper edge thereof and having upwardly extending elongated rigid projections on the ends thereof, said projections having openings defined therein upwardly relative to the upper edge of said back wall adapted to receive fastening bolts, substantially coaxially aligned generally U-shaped sheet metal clips having closely spaced substantially parallel perforated end portions between which the respective projections are closely received in substantially parallel relationship to the end portions for connection of the clips with the basket and rigid support thereof on the handlebar when the clips are tightened to clamp the handlebar, and bolts entered through the perforated end portions of the clips and the openings in said projections serving to tighten the clips on the handlebar and draw the perforated end portions of the clips into close if not clamping engagement with opposite sides of said projections.

2. A bicycle basket comprising a basket body having a bottom wall and side, back, and front walls, a T-shaped frame of large dimensions relative to the height of the back wall and mounted rigidly on the back wall defining a vertical leg and a horizontal cross-member both secured to the back wall, said cross-member having upwardly extending elongated rigid projections on the ends thereof, said T-frame being mounted so that the cross-member thereof is in downwardly spaced parallel relation to the upper edge of said back wall, said projections having openings defined therein upwardly relative to the upper edge of said back wall adapted to receive fastening bolts, substantially coaxially aligned generally U-shaped sheet metal clips encircling a handlebar on which the basket is to be supported, said clips having closely spaced substantially parallel perforated end portions between which the respective projections are closely received in substantially parallel relationship to the end portions for connection of the clips with the basket and rigid support thereof on the handlebar when the clips are tightened to clamp the handlebar, and bolts entered through the perforated end portions of the clips and the openings in said projections serving to tighten the clips on the handlebar and draw the perforated end portions of the clips into close if not clamping engagement with opposite sides of said projections.

3. A bicycle basket as set forth in claim 2, wherein said T-frame has a substantially horizontal forward extension on the lower end of the leg portion thereof under and secured to the bottom wall of the basket.

4. A bicycle basket as set forth in claim 2, wherein said T-frame has a substantially horizontal forward extension on the lower end of the leg portion thereof under and secured to the bottom wall of the basket, said forward extension having on its forward end an upward extension secured to the front wall of the basket.

5. A bicycle basket as set forth in claim 2, wherein the basket body includes a substantially horizontal top frame and another substantially horizontal frame spaced therebelow, and wherein the T-frame has the leg portion thereof secured at vertically spaced points to the top frame and other frame, the cross-portion of the T-frame being below the top frame and having the upwardly extending projections on the end portions thereof secured at their lower end portions to the top frame.

6. A bicycle basket as set forth in claim 2, wherein the basket body includes a substantially horizontal top frame and another substantially horizontal frame spaced therebelow, and wherein the T-frame has the leg portion thereof secured at vertically spaced points to the top frame and other frame, the cross-portion of the T-frame being below the top frame and having the upwardly extending projections on the end portions thereof secured at their lower end portions to the top frame, and wherein the T-frame has a substantially horizontal forward extension on the lower end of the leg portion thereof under and secured to the bottom wall of the basket body.

7. A bicycle basket as set forth in claim 2, wherein the basket body includes a substantially horizontal top frame and another substantially horizontal frame spaced therebelow, and wherein the T-frame has the leg portion thereof secured at vertically spaced points to the top frame and other frame, the cross-portion of the T-frame being below the top frame and having the upwardly extending projections on the end portions thereof secured at their lower end portions to the top frame, and wherein the T-frame has a substantially horizontal forward extension on the lower end of the leg portion thereof under and secured to the bottom wall of the basket body, said forward extension having on its forward end an upward extension secured to the aforesaid other frame.

8. A bicycle basket comprising a basket body having a bottom wall and side, back and front walls, the improvement which consists in the provision on the back wall of mounting means comprising a generally T-shaped frame of large dimensions relative to the height of the back wall and secured rigidly to the back wall, said T-frame defining a vertical leg and a horizontal cross-member both secured to the back wall, said cross-member being disposed in downwardly spaced parallel relation to the upper edge of said back wall and having upwardly extending rigid projections on the ends thereof in which openings are defined upwardly relative to the upper edge of said back wall adapted to receive fastening bolts, said projections being of a width substantially equal to the length thereof and being disposed in substantially coplanar relationship substantially parallel to the back wall, generally U-shaped sheet metal clips for encirclement of a handlebar on which the basket is to be supported, said clips having closely spaced substantially parallel perforated ends between which the respective projections are closely received in substantially parallel relationship to said end portions for connection of the clips with the basket and rigid support thereof on the handlebar when the clips are tightened in clamping engagement with the handlebar, bolts entered through the perforated end portions of the clips and the openings in said projections for tightening the clips on the handlebar and drawing the perforated end portions of the clips into close if not clamping engagement with opposite sides of said projections, and a brace extending rearwardly from the leg of the T-shaped frame and secured to said leg at one end and having means on the other end for connection with the vertical stem part of a handlebar.

References Cited in the file of this patent
UNITED STATES PATENTS

| | | |
|---|---|---|
| 1,094,885 | Dennis | Apr. 28, 1914 |
| 1,359,329 | Carson | Nov. 16, 1920 |
| 1,924,343 | Andrews | Aug. 29, 1933 |
| 2,498,446 | Pawsat | Feb. 21, 1950 |

FOREIGN PATENTS

| | | |
|---|---|---|
| 133,091 | Sweden | Sept. 25, 1951 |